(12) United States Patent
He et al.

(10) Patent No.: US 7,780,755 B2
(45) Date of Patent: Aug. 24, 2010

(54) CRACK-RESISTANT CERAMIC HONEYCOMB ARTICLES AND METHODS OF MANUFACTURING SAME

(75) Inventors: Lin He, Horseheads, NY (US); Christopher John Malarkey, Corning, NY (US); Jonathan David Pesansky, Corning, NY (US)

(73) Assignee: Corning Incorporated, Corning, NY (US)

(*) Notice: Subject to any disclaimer, the term of this patent is extended or adjusted under 35 U.S.C. 154(b) by 241 days.

(21) Appl. No.: 11/807,982

(22) Filed: May 31, 2007

(65) Prior Publication Data

US 2007/0281128 A1 Dec. 6, 2007

Related U.S. Application Data

(60) Provisional application No. 60/810,093, filed on May 31, 2006.

(51) Int. Cl.
| | |
|---|---|
| B01D 39/06 | (2006.01) |
| B01D 39/14 | (2006.01) |
| B01D 24/00 | (2006.01) |
| B01D 50/00 | (2006.01) |
| F01N 3/10 | (2006.01) |
| F01N 3/08 | (2006.01) |
| F01N 3/00 | (2006.01) |
| B32B 3/12 | (2006.01) |
| B01J 23/00 | (2006.01) |

(52) U.S. Cl. .............. 55/523; 55/522; 55/524; 428/118; 422/172; 422/173; 422/174; 422/175; 422/176; 422/177; 422/178; 422/179; 422/180; 60/297; 502/303

(58) Field of Classification Search .......... 55/522–524; 428/118; 422/172–180; 60/297; 502/303
See application file for complete search history.

(56) References Cited

U.S. PATENT DOCUMENTS

| | | | | |
|---|---|---|---|---|
| 4,276,071 | A | * | 6/1981 | Outland .............. 55/523 |
| 4,416,675 | A | * | 11/1983 | Montierth ............ 55/502 |
| 5,030,398 | A | | 7/1991 | Hamanaka et al. ...... 264/63 |
| 5,183,608 | A | * | 2/1993 | Guile ............... 264/44 |
| 5,849,391 | A | | 12/1998 | Miura et al. .......... 428/116 |
| 5,938,992 | A | | 8/1999 | Hamanaka et al. ...... 264/43 |
| 6,214,437 | B1 | | 4/2001 | Beall et al. .......... 428/116 |
| 6,300,266 | B1 | | 10/2001 | Beall et al. .......... 510/119 |
| 6,319,870 | B1 | * | 11/2001 | Beall et al. .......... 501/119 |
| 6,432,856 | B1 | | 8/2002 | Beall et al. .......... 501/118 |
| 6,455,124 | B1 | | 9/2002 | Beall et al. .......... 428/116 |
| 6,506,336 | B1 | | 1/2003 | Beall et al. .......... 264/630 |

(Continued)

FOREIGN PATENT DOCUMENTS

WO 2005/065188 7/2005

(Continued)

*Primary Examiner*—Walter D Griffin
*Assistant Examiner*—Amber Orlando
(74) *Attorney, Agent, or Firm*—Joseph M. Homa

(57) ABSTRACT

The present invention provides honeycomb ceramic articles and methods of manufacturing such articles having few or no defects in the outer skin. Methods for minimizing and/or eliminating cracks in thin-wall and ultra-thin-wall cordierite honeycomb articles are disclosed. Advantageously, the present invention prevents skin cracks from forming during the production of thin-wall and ultra-thin-wall cordierite honeycomb articles by optimizing skin properties such as porosity, thickness and pore size distribution.

10 Claims, 4 Drawing Sheets

U.S. PATENT DOCUMENTS

| | | | |
|---|---|---|---|
| 6,764,743 B2 * | 7/2004 | Kato et al. | 428/118 |
| 6,803,086 B2 | 10/2004 | Noguchi et al. | 428/116 |
| 6,864,198 B2 | 3/2005 | Merkel | 501/80 |
| 2001/0033910 A1 | 10/2001 | Ikeshima | 428/116 |
| 2002/0098320 A1 | 7/2002 | Beall et al. | 428/116 |
| 2004/0029707 A1 * | 2/2004 | Beall et al. | 501/119 |
| 2004/0105956 A1 * | 6/2004 | Ito et al. | 428/116 |
| 2004/0137194 A1 | 7/2004 | Fukao et al. | 428/116 |
| 2004/0148916 A1 * | 8/2004 | Merkel | 55/523 |
| 2004/0177600 A1 * | 9/2004 | Ichikawa et al. | 55/523 |
| 2005/0076627 A1 * | 4/2005 | Itou et al. | 55/523 |
| 2005/0106356 A1 | 5/2005 | Ikeshima | 428/116 |
| 2005/0147791 A1 | 7/2005 | Gulati et al. | 428/116 |
| 2005/0214503 A1 * | 9/2005 | Sakamoto | 428/116 |
| 2007/0026188 A1 | 2/2007 | Bookbinder et al. | 428/73 |
| 2007/0119133 A1 * | 5/2007 | Beall et al. | 55/523 |
| 2007/0119134 A1 * | 5/2007 | Beall et al. | 55/523 |

FOREIGN PATENT DOCUMENTS

| | | |
|---|---|---|
| WO | 2006/046542 | 5/2006 |
| WO | WO2007142971 | * 12/2007 |

* cited by examiner

CRACK-RESISTANT CERAMIC HONEYCOMB ARTICLES AND METHODS OF MANUFACTURING SAME

This application claims the benefit of U.S. Provisional Application No. 60/810,093, filed May 31, 2006, entitled "Crack-Resistant Ceramic Honeycomb Articles and Methods of Manufacturing Same."

TECHNICAL FIELD AND INDUSTRIAL APPLICABILITY OF THE INVENTION

The present invention relates to ceramic honeycomb articles and methods of manufacturing the same. More particularly, the present invention relates to methods of minimizing and/or eliminating skin cracks in thin-wall and ultra-thin-wall honeycomb articles, and to honeycomb articles so produced.

BACKGROUND OF THE INVENTION

Cordierite ceramic honeycomb articles have broad applications in automotive, environmental and chemical industries. Cordierite honeycomb articles are used as an exhaust gas purifying catalyst carrier, a filter, or a heat exchanger. In automotive applications, cordierite honeycomb articles have been used as a catalyst carrier for exhaust gas purification. The exhaust gases emitted by internal combustion system include hydrocarbons (HC), carbon monoxide (CO) and nitric oxides ($NO_x$). Automotive, material, and environmental industries have worked intensively to reduce the amount of emission gases and to meet the tightened regulations every year.

To improve emission control efficiency of honeycomb articles such as monoliths, it is desirable to have a ceramic honeycomb carrier having certain properties. These properties include low thermal mass for fast light-off and better catalytic performance at lower temperature; low bulk density but with the same geometric surface area (GSA) for reducing heat capacity; low pressure loss for improved fuel consumption; good mechanical strength; and high thermal shock resistance.

To achieve the above-described desirable properties, thin-wall and ultra-thin-wall honeycomb articles have been designed and developed to meet the fast light-off and lower pressure loss requirements. The reduction of the honeycomb wall thickness, however, is difficult in the production technology because, in general, reduction of the honeycomb wall thickness accompanies a decline in the mechanical strength of the honeycomb article itself.

In manufacturing practice, the amount of the material, the particle packing and the extrusion pressure required for forming the skin of the honeycomb articles differ from those required for forming the webs of the honeycomb articles. Normally, in honeycomb articles, the thickness of the skin is greater than the thickness of the webs; therefore, the skin and webs are inevitably unbalanced. If the skin is made thicker, then cell deformation defects occurs. If, on the other hand, the skin is made thinner, then fissure (cracking) of the skin may occur. In cordierite thin-wall and ultra-thin-wall honeycomb articles, several defects have been observed in the outer wall including straight vertical fissures, vertical fissures jagged within a single cell, vertical fissures jagged within several cells, and horizontal ring-off cracks. Chips, bumps and groves are also resources of defects and cracks. The formation of ceramic honeycomb articles having good quality skin extrude to shape skin is desired.

Various methods have been proposed to solve the above-mentioned problems. Each of these approaches, however, have disadvantages including a mismatch in the coefficient of thermal expansion (CTE) of the reinforcing material and the coefficient of thermal expansion of the honeycomb structure, an overall decrease in strength, and a decrease in gas purification efficiency.

During typical production processes, a cordierite honeycomb substrate experiences a temperature difference in the furnace. When it is coated with catalyst, the honeycomb substrate is treated with a certain temperature gradient. When it is used as a catalyst carrier for an exhaust gas purifier, a temperature difference is generated in the catalyst carrier because of heat released by the oxidation reaction of the unburned hydrocarbon and carbon monoxide present in the exhaust gas. All of the above-mentioned proposed methods require that the honeycomb substrate have higher thermal shock resistance and a capability to reduce or disperse the thermal stress. The thermal shock resistance is related to several properties including, for example, thermal expansion coefficient, elastic modulus, strength, porosity, pore size distribution and pore shape. Increasing thermal shock resistance is important to minimize or prevent the risk of cracking and damage in catalyst carriers.

Cordierite is a desired material for the manufacture of honeycomb articles. Typically, the present invention is used in automotive exhaust gas treatment systems, such as ultra-thin-wall products, generally having a wall thickness of less than 4 mil. Other uses include high temperature articles, such as catalytic converters, NOx adsorber substrates, catalyst substrates, and diesel particulate filters because of its relatively low cost. Cordierite materials are typically manufactured by mixing a raw batch that includes talc, alumina, aluminum hydroxide, kaolin and silica. The batch is then blended with a binder (such as methylcellulose) and a lubricant to form a plastic mixture. This plastic mixture is then passed through a die, formed into a green body, and sintered. U.S. Pat. No. 6,864,198 (hereby incorporated by reference in its entirety) assigned to Corning Incorporated discloses one method of forming a cordierite honeycomb structure.

Accordingly, cordierite honeycomb articles structures having no defects such as fissures and/or cracks are much sought after. Methods of manufacturing such honeycomb articles are similarly sought.

SUMMARY OF THE INVENTION

The present invention provides methods of minimizing and/or eliminating skin cracks in thin-wall (including ultra-thin-wall) honeycomb articles, such as cordierite honeycomb articles, during production of such articles. Specifically, various embodiments of the cordierite honeycomb articles of the present invention and methods for their manufacture are disclosed herein.

Additionally, the present invention is directed to improving the thermal shock resistance of cordierite honeycomb articles, especially for improving resistance to crack propagation. The present invention also provides desirable skin thickness and desirable skin properties for thin-walled cordierite honeycomb articles.

According to embodiments described herein, in one broad aspect, the invention relates to a honeycomb ceramic article having a skin and web portions wherein the porosity of the skin ($P_s$) is greater than the porosity of the webs ($P_w$).

In other embodiments of the invention, the pore size and normalized pore size distribution ($PSD_w = (D_{90} - D_{10})/D_{50}$) of the webs are optimized, preferably to between about 1.5 and 4.5; or even 1.6 to 3.9; or even yet 2.0 to 3.0.

Further, according to embodiments of the invention, a method of reducing skin cracks in cordierite honeycombs is disclosed including extruding the plasticized batch to form a honeycomb green body and firing the green body to form a honeycomb with a controlled porosity ratio $P_s/P_w$. Preferably, the porosity ratio is greater than about 1.12, or even between 1.12 and 1.6. In some embodiments, the porosity ratio is greater than or equal to 1.20, or even 1.28.

In accordance with yet further embodiments of the invention, a method of reducing skin cracks in cordierite honeycomb articles is provided, comprising the steps of preparing a plasticized batch of ceramic-forming material including alumina, kaolin, boehmite, silica and talc, wherein the talc has a particle size distribution given by the relationship (D90−D10)/D50 of greater than 1.50; extruding the ceramic forming material to form a honeycomb green body having webs and a surrounding skin; and firing the green body to form a ceramic honeycomb article having skin of less than 12 mils thickness wherein the skin, after the firing step is the skin. Preferably, the talc has a median particle size between 2.2 μm and 4.0 μm (by sedigraph). Most preferably, a single talc source is used.

These, as well as other aspects and advantages of the present invention will become more apparent after careful consideration is given to the following detailed description of the preferred exemplary embodiments thereof, especially in conjunction with the accompanying drawings.

DETAILED DESCRIPTION AND PREFERRED EMBODIMENTS OF THE INVENTION

Figure 1:
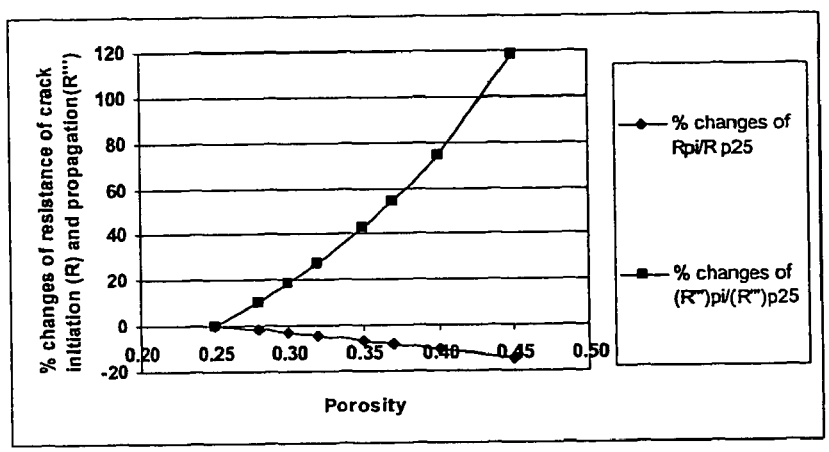
FIG. 1 is a graph illustrating the percent of change in relative resistance of crack initiation ($Rp_i/Rp_{25}$) and relative resistance of crack propagation (($R'''$)$p_i$/($R'''$)$p_{25}$) using the property of porosity at 25% as the baseline.

The present invention provides methods and designs for minimizing and/or eliminating cracks in thin-wall cordierite honeycomb articles, such as thin-walled cordierite ceramic honeycomb catalyst substrates. Advantageously, the present invention prevents skin cracks from forming during the production of thin-wall (including ultra-thin-wall) cordierite honeycomb articles by optimizing their skin properties such as porosity, pore size, pore size distribution, pore shape and skin thickness.

In a one embodiment the batch of raw materials includes 6-16 weight percent Boehmite (aluminum hydroxide) as an alumina-forming source, 5-14 weight percent alumina as an alumina-forming source, 2 to 12 weight percent silica, 38 to 42 weight percent of a magnesium source such as a fine talc (having a median particles size between 2.2 and 4.0 μm), and 28 to 40 percent kaolin. It is understood that the actual weights of the cordierite-producing raw materials for a given mixture are chosen to yield a body that is predominately composed of the cordierite phase after firing, preferably greater than 90% cordierite phase.

The raw material mixture is intimately blended with a vehicle and forming aids which impart plastic formability and green strength to the raw materials when they are shaped into a body. Forming may be done by, for example, molding or extrusion. When forming is done by extrusion through a die, most typically methylcellulose serves as a temporary binder, sodium stearate, tall oil or stearic acid serve as surfactants, and a lubricant, such as hydrogenated synthetic hydrocarbon oil Durasyn, is employed. The relative amounts of forming aids can vary depending on factors such as the nature and amounts of raw materials used, etc. For example, the typical amounts of forming aids are about 2% to about 10% by weight of methylcellulose (preferably about 3% to about 6% by weight), and about 0.5% to about 1% by weight surfactant, and 2% to 10% by weight lubricant. More preferably, about 0.8% by weight surfactant and about 5% by weight lubricant are utilized. The raw materials and the forming aids are mixed together in dry form and then mixed with water as the vehicle. The amount of water can vary from one batch of materials to another and therefore is determined by pre-testing the particular batch for extrudability.

The resulting plastic mixture is then formed into a green body, preferably a honeycomb structure with interconnected webs and a surrounding skin. Bodies that have not been sintered are referred to as green bodies. Extrusion techniques are well known in the art. The green bodies are typically dried and then fired at a sufficient temperature and for a sufficient time to form the final product structure. The firing is preferably done by heating to a maximum temperature of about 1395 to 1415° C. over 30 to 200 hours, and held there for at least 5 hours, preferably about 6 hours. The compositions of the present invention result in formation of a ceramic structure, which is predominately of a phase approximating the stoichiometry $Mg_2Al_4Si_5O_{18}$.

Figure 5:
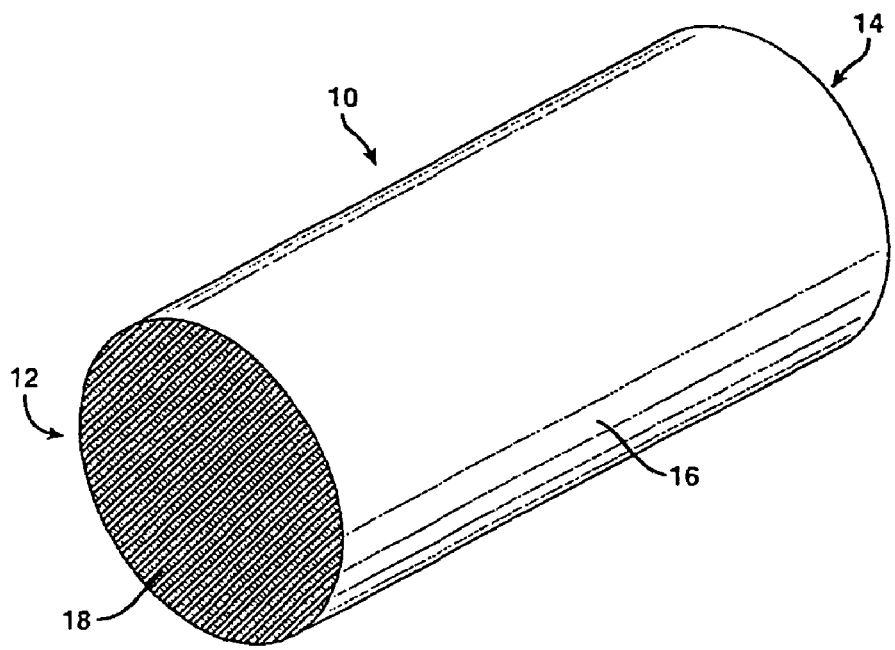
FIG. 5 is an isometric view of a honeycomb article according to an exemplary embodiment of the present invention.

As shown in FIG. 5, a thin-walled honeycomb article 10 according to the present invention may be formed having a body 16 extruded from the plasticized raw material mixture to include a plurality of channels 18 extending in parallel between an inlet end 12 and an outlet end 14. The thin-wall honeycomb article may have a channel density of 600 cells/in² or above, or even 900 cells/in² and above, a wall thickness of less than 3.0 mils, and a skin thickness of less than 12 mils. For the purpose of this application the term honeycomb is intended to include materials having a generally honeycomb structure, but is not strictly limited to a hexagonal structure; for example octagonal, triangular, square, rectangular, circular, combinations thereof or any other suitable channel shape may be used.

According to the present invention, skin cracks in thin-wall and ultra-thin-wall cordierite honeycomb articles can be minimized and/or eliminated by controlling the porosity of the skin of the honeycomb articles and, more particularly, by increasing the porosity of the skin ($P_s$) as compared to the webs ($P_w$). Typically, conventional cordierite honeycomb articles have a skin total porosity of about 25%. In accordance with the present invention, the skin total porosity of thin-wall and ultra-thin-wall honeycomb articles can be increased up to about 35%, or even up to about 45%. This increase in skin total porosity has been found to decrease thermal stress concentration and to reduce the propensity of crack propagation. Cordierite honeycomb articles having higher skin porosity (higher than the webs) can be achieved by one or more of the following: (a) controlling the skin thickness, (b) adding pore former into the skin forming material and then co-extruding the skin forming material with the honeycomb matrix, (c) using new die designs in forming the skin.

According to one embodiment of the present invention, higher skin porosity of cordierite honeycomb articles can be achieved by controlling the overall thickness of the skin. A honeycomb article having a thinner skin than conventional thin-walled honeycomb articles may be formed by introducing a smaller amount of the material that enters into the skin forming area through the extrusion hardware control. The extrusion pressure and material packing are different as comparing thicker skin formation. As a result, the porosity of the skin is different from that of a thick skin. According to a preferred embodiment, the thickness of the outer peripheral skin is made to be less than 12 mils (305 μm).

In accordance with the present invention, it has been found that thinner skin with high porosity will decrease the thermal conductivity of the skin and then, in turn, decrease the temperature variation between external skin and internal skin during cooling after formation of cordierite honeycomb articles. This results in less thermal stress in the skin.

As shown below in equation (1), the resistance of crack initiation (R) increases with higher rupture strength (σ or MOR), lower modulus of elasticity (E or Emod) and lower coefficient of thermal expansion (α or CTE). Based on equation (2), however, the resistance of crack propagation (R''') increases with higher modulus of elasticity and lower rupture strength. Both rupture strength and modulus of elasticity are the functions of porosity, as shown in equations (3) and (4). The coefficient of thermal expansion, however, is independent of the porosity, as shown in equation (5).

$$R(°C.)=\sigma(1-v)/\alpha E \qquad \text{Equation (1)}$$

$$R'''((psi)^{-1})=E/\sigma^2(1-v) \qquad \text{Equation (2)}$$

$$MORp=MORo(1-P)^{3/2} \qquad \text{Equation (3)}$$

$$Ep=Eo(1-P^{2/3})^{1.21} \qquad \text{Equation (4)}$$

$$CTEp=CTEo \qquad \text{Equation (5)}$$

In each of the equations (1)-(5), σ is rupture strength, ν is Poisson's ratio, α is coefficient of thermal expansion, E is Young's modulus of elasticity, "p" and "o" characterize the porous material and the non-porous material, respectively, and P is the volume fraction of the pore. The physical interpretations of R and R''' are the maximum ΔT allowable for steady heat flow and minimum in elastic energy at fracture available for crack propagation, respectively.

Table 1 illustrates the relationship of the resistance of crack initiation (R) and resistance of crack propagation (R''') with porosity changes, in which the ratio of MORp/MORo represents the MOR decreases under different porosity. The ratio of Ep/Eo represents the decrease in Emod as a result of porosity change. The ratios of Rp/Ro and R'''p/R'''o show the resistance of crack initiation and resistance of crack propagation changes with porosity change when assuming the change of Poisson's ratio with porosity is small or negligible.

TABLE 1

| Porosity | MORp/MORo | Ep/Eo | Rp/Ro | R'''p/R'''o |
|---|---|---|---|---|
| 0.25 | 0.563 | 0.542 | 1.037 | 1.714 |
| 0.28 | 0.518 | 0.509 | 1.019 | 1.893 |
| 0.30 | 0.490 | 0.487 | 1.006 | 2.029 |
| 0.32 | 0.462 | 0.466 | 0.992 | 2.180 |
| 0.35 | 0.423 | 0.436 | 0.970 | 2.441 |
| 0.37 | 0.397 | 0.416 | 0.954 | 2.642 |
| 0.40 | 0.360 | 0.388 | 0.928 | 2.992 |
| 0.45 | 0.303 | 0.343 | 0.883 | 3.746 |
| 0.50 | 0.250 | 0.300 | 0.832 | 4.805 |

Table 2 illustrates the percent of change of relative resistance of crack initiation ($Rp_i/Rp_{25}$) and relative resistance of crack propagation ($(R''')p_i/(R''')p_{25}$) that were calculated based on equations (6) and (7), respectively, in which "Pi" index represents character at porosity other than 25% and "$P_{25}$" index represents character at 25% porosity.

$$\% \text{ change of } Rp_i/Rp_{25}=100\%\{[(\sigma/\alpha^*E)p_i/(\sigma/\alpha^*E)p_{25}]-1\} \qquad \text{Equation (6)}$$

$$\% \text{ change of } (R''')p_i/(R''')p_{25}=100\%\{[(E/\sigma^2)p_i/(E/\sigma^2)p_{25}]-1\} \qquad \text{Equation (7)}$$

TABLE 2

| Porosity | Ratio of Ps/Pw | % change of $Rp_i/Rp_{25}$ | % change of $(R''')p_i/(R''')p_{25}$ |
|---|---|---|---|
| 0.25 | 1.00 | 0.00 | 0.00 |
| 0.28 | 1.12 | −1.73 | 10.42 |
| 0.30 | 1.20 | −3.00 | 18.35 |
| 0.32 | 1.28 | −4.35 | 27.18 |
| 0.35 | 1.40 | −6.51 | 42.41 |
| 0.37 | 1.48 | −8.05 | 54.13 |
| 0.40 | 1.60 | −10.49 | 74.57 |
| 0.45 | 1.80 | −14.90 | 118.52 |

Referring now to the drawings, in FIG. 1, which is based on Table 2, there is shown a graph illustrating the percent of changes relative resistance of crack initiation ($Rp_i/Rp_{25}$) and relative resistance of crack propagation ($(R''')p_i/(R''')p_{25}$) using the property of porosity at 25% as the baseline. FIG. 1 demonstrates how the relative resistance of crack initiation ($Rp_i/Rp_{25}$) decreases and relative resistance of crack propagation ($(R''')p_i/(R''')p_{25}$) increases with ratio of Ps/Pm (Ps is the porosity of the skin, Pw is the porosity of the wall).

As shown in FIG. 1, the relative resistance of crack propagation increased about 118%, while the relative resistance of crack initiation only decreased less than about 15%. The porosity of the skin increases from about 25% to up to about 45%, preferably from about 25% to about 35%. At this range, the decrease in $Rp_i/Rp_{25}$ is less than about 7% and the increase in $(R''')p_i/(R''')p_{25}$ is greater than about 40%.

Figure 2:
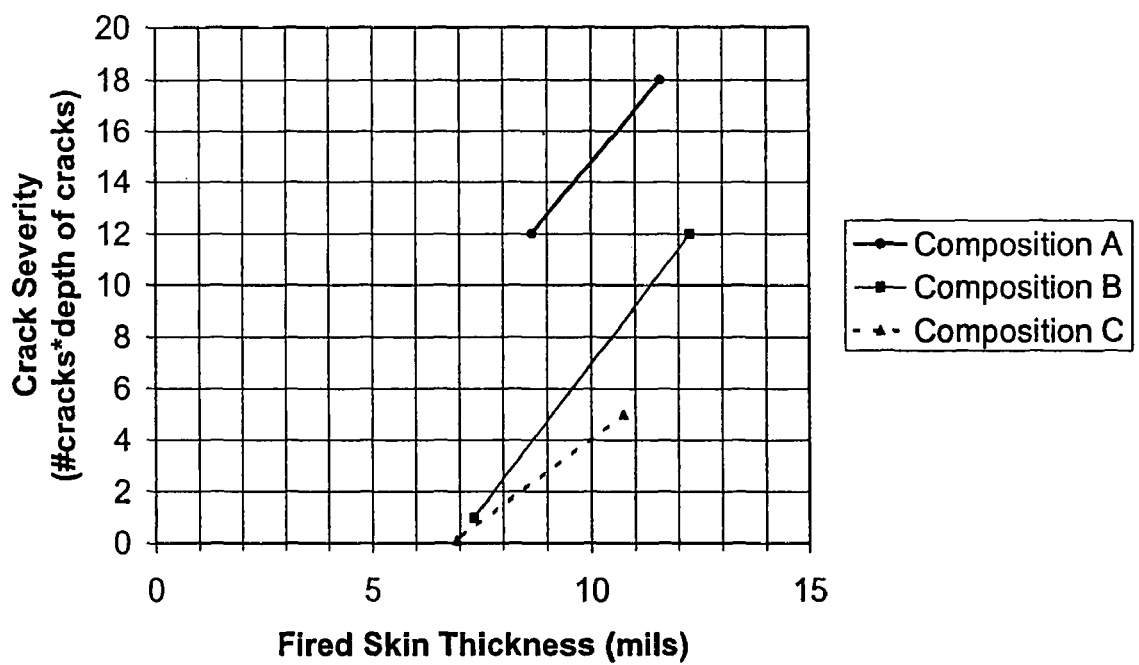
FIG. 2 is a graph illustrating the effect of fired skin thickness on crack severity for cordierite honeycomb articles made according to the present invention.

Thinner skin with relatively higher porosity will decrease the thermal conductivity of the skin and then decrease the temperature variation between external skin and internal skin during cooling after cordierite formation. This will result in less thermal stress in the skin. The preferred skin thickness is less than or equal to four times that of web thickness and greater than or equal to two times that of thickness of the web portion. In a most preferred embodiment, the outer skin is 3.0 to 3.5 times that of the thickness of the web portions. FIG. 2 illustrates the effect of skin thickness on crack severity.

Also in accordance with the present invention, cracks in the skin of cordierite honeycomb articles can be minimized and/or eliminated by controlling the pore shape and/or pore size distribution. It is crucial to design the porous microstructure of the skin to achieve the best possible combination of macroscopic properties. Although the presence of pores usually decreases the mechanical properties of the materials, in some cases even the fracture toughness may be enhanced by addition of porosity. The effect of pore size, aspect ratio, and volume fraction on mechanical properties has been investigated. As shown below, equation (4) can be modified to equation (8).

$$Ep = Eo(1-P^{2/3})^s (P < \text{or} = 0.4), \quad \text{Equation (8)}$$

where $S = 1.21 \ (z/x)^{1/3} \cdot \{1+[(z/x)^{-2}-1]*\cos^2\varnothing\}^{1/2}$ and $z/x$ is the axial ratio of the pore. The case of random statistical orientation is obtained by setting $\cos^2\varnothing = 0.33$.

Figure 3:
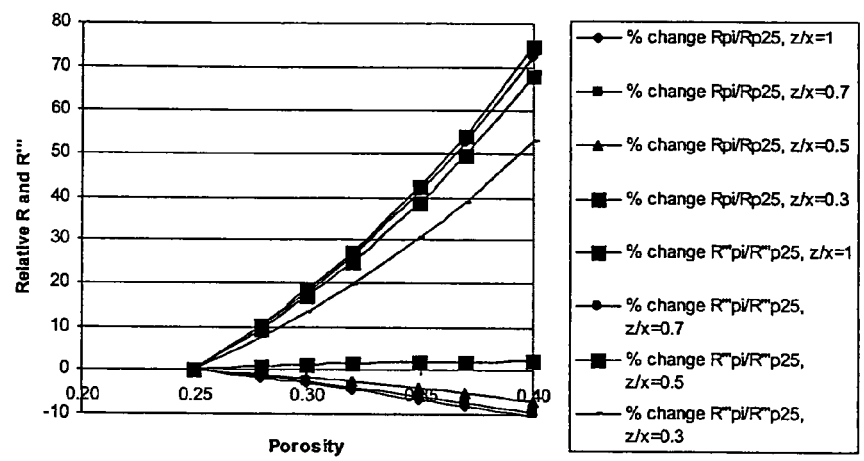
FIG. 3 is a graph illustrating the relative resistance of crack initiation ($Rp_i/Rp_{25}$) and relative resistance of crack propagation (($R'''$)$p_i$/($R'''$)$p_{25}$) as a function of pore aspect ratio (z/x).

Table 3 includes the relative resistance of crack initiation (Rpi/Rp25) and the relative resistance of crack propagation ((R''')pi/(R''')p25) as a function of pore aspect ratio (z/x). The relative resistance of crack initiation (Rpi/Rp25) and relative resistance of crack propagation ((R''')pi/(R''')p25) were calculated by using equations (6) and (7). FIG. 3 shows the relative resistance of crack initiation (Rpi/Rp25) and the relative resistance of crack propagation ((R''')pi/(R''')p25) as a function of pore aspect ratio (z/x) when using a porosity of 25% as a baseline.

TABLE 3

| Porosity | % change Rpi/Rp 25, z/x = 1 | % change Rpi/Rp 25, z/x = 0.7 | % change Rpi/Rp 25, z/x = 0.5 | % change Rpi/Rp 25, z/x = 0.3 | % change R'''pi/R''' p25, z/x = 1 | % change R'''pi/R'''p 25, z/x = 0.7 | % change R'''pi/R'''p 25, z/x = 0.5 | % change R'''pi/R'''p 25, z/x = 0.3 |
|---|---|---|---|---|---|---|---|---|
| 0.25 | 0 | 0 | 0 | 0 | 0 | 0 | 0 | 0 |
| 0.28 | −1.73 | −1.53 | −1.00 | 0.80 | 10.4 | 10.2 | 9.6 | 7.6 |
| 0.30 | −3.00 | −2.65 | −1.78 | 1.23 | 18.3 | 17.9 | 16.9 | 13.4 |
| 0.32 | −4.35 | −3.87 | −2.65 | 1.58 | 27.2 | 26.5 | 25.0 | 19.8 |
| 0.35 | −6.51 | −5.83 | −4.12 | 1.97 | 42.4 | 41.4 | 38.9 | 30.6 |
| 0.37 | −8.05 | −7.24 | −5.19 | 2.13 | 54.1 | 52.8 | 49.5 | 38.8 |
| 0.40 | −10.49 | −9.49 | −6.95 | 2.25 | 74.6 | 72.6 | 67.9 | 52.8 |

As shown in FIG. 3, with the same porosity, the relative resistance of crack propagation increased by increasing pore aspect ratio. The spherical pores or semi-spherical pores with an aspect ratio (z/x) of about 1.0 have a higher resistance of crack propagation as compared with that of oblate pores with an aspect ratio (z/x) of about 0.3.

A batch is prepared as described above using the constituents shown in Table 4. Talc A has a (D90−D10)/D50 of 1.485. Talc B has a (D90−D10)/D50 of 2.491. Talc C has a (D90−D10)/D50 of 1.930. Talc D has a (D90−D10)/D50 of 1.550. Talc E has a (D90−D10)/D50 of 2.256. Each batch is extruded, fired and tested to establish the data below.

TABLE 4

| | Batch composition (in weight %) | | | | | |
|---|---|---|---|---|---|---|
| | A (Comparative) | B (Inventive) | C (Inventive) | D (Inventive) | E (Inventive) | F (Inventive) |
| Talc A | 39.75 | — | — | — | — | — |
| Talc B | — | 39.75 | — | — | — | — |
| Talc C | — | — | 39.75 | — | — | 39.75 |
| Talc D | — | — | — | 39.75 | — | — |
| Talc E | — | — | — | — | 39.75 | — |
| Kaolin A (calcined) | 17.13 | 17.13 | 17.13 | 17.13 | 17.13 | — |
| Kaolin B (calcined) | — | — | — | — | — | 17.13 |
| Kaolin A | 16.55 | 16.55 | 16.55 | 16.55 | 16.55 | |
| Kaolin B | | | | | | 16.55 |
| Alumina | 9.52 | 9.52 | 9.52 | 9.52 | 9.52 | 9.52 |
| Boehmite | 11.05 | 11.05 | 11.05 | 11.05 | 11.05 | 11.05 |
| silica | 6.00 | 6.00 | 6.00 | 6.00 | 6.00 | 6.00 |

Table 5 shows the normalized pore size distribution within the web of the extruded honeycomb ($PSD_W=(D_{90}-D_{10})/D_{50}$) of comparative sample A and inventive samples B-F. As can be seen, $PSD_W$ is between about 1.5 and 4.5; or even about 1.6 and 3.9, or in some embodiments between about 2.0 and 3.0.

TABLE 5

Pore Size and Distribution
$PSD_w = (D90-D10)/D50$

|  | A (Comparative) | B (Inventive) | C (Inventive) | D (Inventive) | E (Inventive) | F (Inventive) |
| --- | --- | --- | --- | --- | --- | --- |
| $PSD_w$ | 1.03 | 3.54 | 2.54 | 1.81 | 4.48 | 1.84 |

Figure 4A:
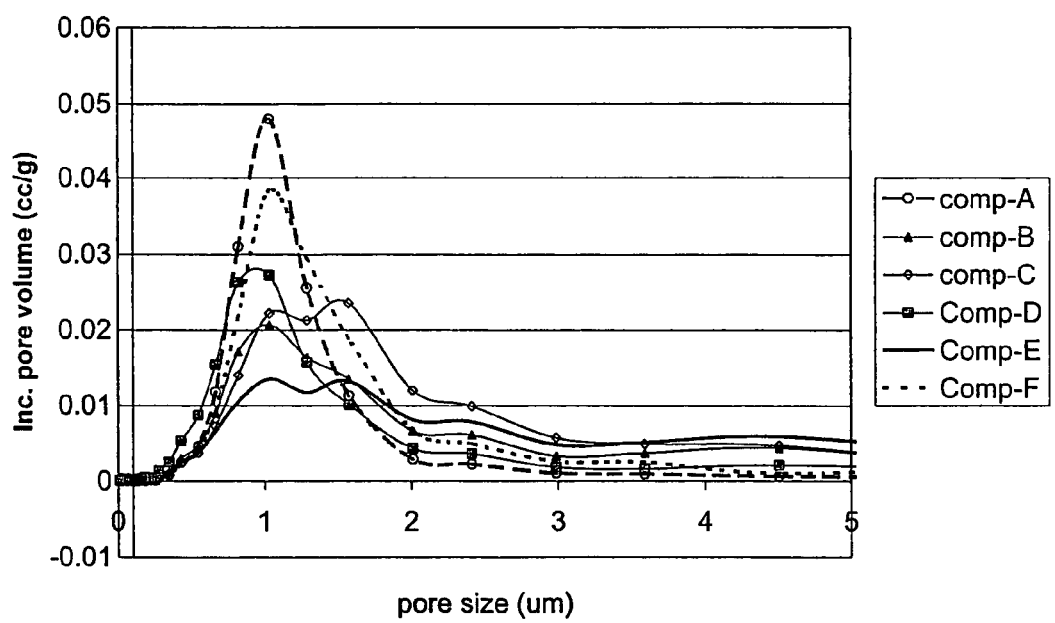
FIGS. 4 A-D are graphs illustrating the impact of pore shape and pore size distribution on cracking of cordierite honeycomb articles made according to the present invention.
Figure 4B:
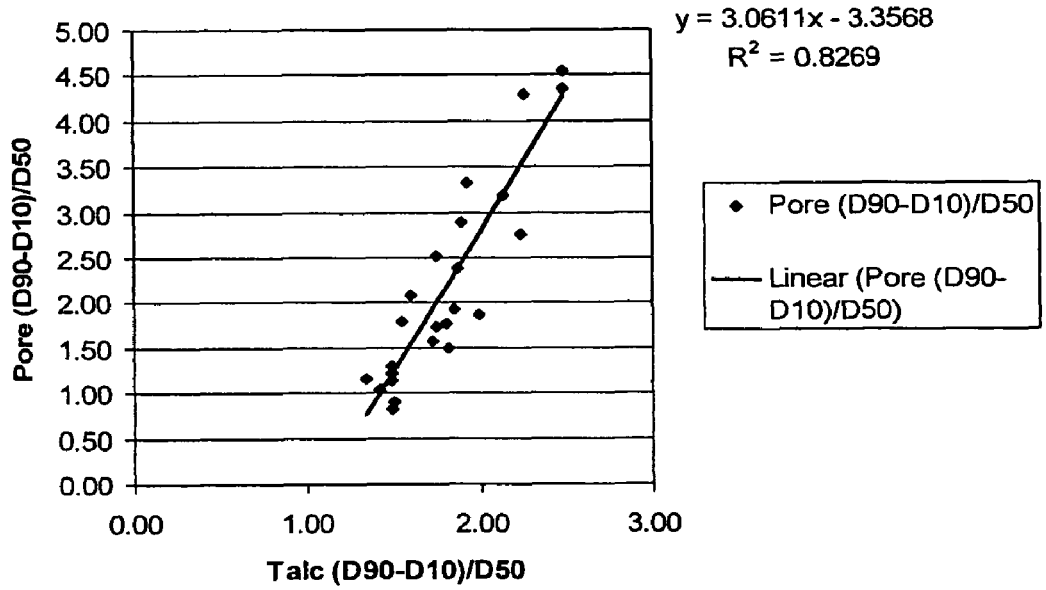
Figure 4C:
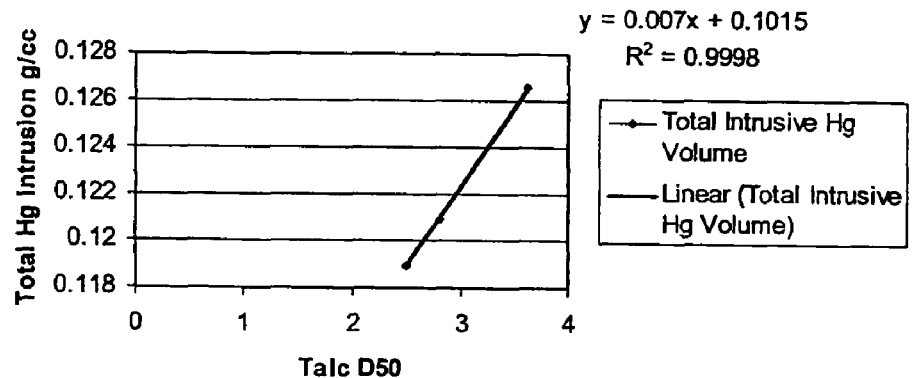

As noted, controlling the pore size distribution of the skin (PSDS) is another way to minimize and/or eliminate the formation of skin cracks in cordierite honeycomb articles according to the present invention. FIGS. 4A-C illustrate the impact of pore size distribution, particularly coarser and broader pore size distribution, for inventive compositions B-F on cracking. This pore size distribution may be directly controlled by limiting the talc particles size within the composition to have single talc source which has a particle size distribution given by the relationship (D90–D10)/D50 of greater than 1.50; preferably with a median particles size between 2.2 and 4.0 microns.

Narrow pore size distributions are achieved using macrocrystalline talc sources (prior art composition A), while broader pore size distributions according to embodiments of the invention may be achieved through the use of microcrystalline talc sources (inventive compositions B-F). Table 6 shows the pore size range versus % in range for the various talcs A-F used. FIG. 4A graphically represents the pore size distribution of comparative composition A, and of inventive compositions B-F.

TABLE 6

Pore Size Range Versus % in Range

|  | Comp-A (%) | Invent-B (%) | Invent-C (%) | Invent-D (%) | Invent-E (%) | Invent-F (%) |
| --- | --- | --- | --- | --- | --- | --- |
| <2 um | 91.7 | 59.7 | 73.7 | 79.0 | 45.5 | 70.4 |
| 2-5 um | 5.4 | 29.2 | 18.1 | 16.3 | 35.7 | 23.1 |
| 5-10 um | 1.6 | 7.1 | 5.9 | 3.1 | 11.0 | 3.5 |
| 10-20 um | 1.0 | 3.0 | 1.8 | 1.2 | 5.9 | 2.0 |
| 20-40 um | 0.3 | 0.8 | 0.4 | 0.3 | 1.5 | 0.6 |
| >40 um | 0.1 | 0.3 | 0.2 | 0.0 | 0.3 | 0.4 |

The talc particle size distribution (D90–D10)/D50 and pore size distribution (D90–D10)/D50 for talc A, B, C, D and E are shown in TABLE 7. The relationship between particle size distribution and pore size distribution is graphically represented in FIG. 4B.

TABLE 7

| Type | Talc (D90-D10)/D50 | Pore (D90-D10)/D50 |
| --- | --- | --- |
| Talc-A | 1.485 | 1.223 |
| Talc-A | 1.485 | 1.150 |
| Talc-A | 1.485 | 1.302 |
| Talc-A | 1.485 | 0.829 |
| Talc-B | 2.491 | 4.350 |

TABLE 7-continued

| Type | Talc (D90-D10)/D50 | Pore (D90-D10)/D50 |
| --- | --- | --- |
| Talc-B | 2.491 | 4.547 |
| Talc-C | 1.930 | 3.328 |
| Talc-E | 2.256 | 4.300 |
| Talc-D | 1.550 | 1.800 |

Table 8 shows the mercury intrusion versus D50 for several talcs. The relationship between D50 and mercury intrusion is shown in FIG. 4C. Utilizing talc having a median particle size (as measured by Sedigraph) is preferably between 2.2 µm and 4.0 µm produces thin walled structures having higher intrusion volume. Similarly, it has been discovered that using talc having (D90–D10)/D50 of greater than 1.50, more preferably greater than 1.75 results in broad pore size distribution in the skin, i.e., (D90–D10)/D50 and, therefore, results in thin walled honeycomb articles which exhibit less propensity for cracking.

TABLE 8

| Talc | Talc D50 (µm) | Total Intrusive Hg Volume |
| --- | --- | --- |
| A | 2.0 | 0.1467 |
| B | 1.9 | 0.1187 |
| C | 3.6 | 0.1459 |
| D | 2.4 | 0.1346 |
| E | 4.7 | 0.1149 |

Figure 4D:
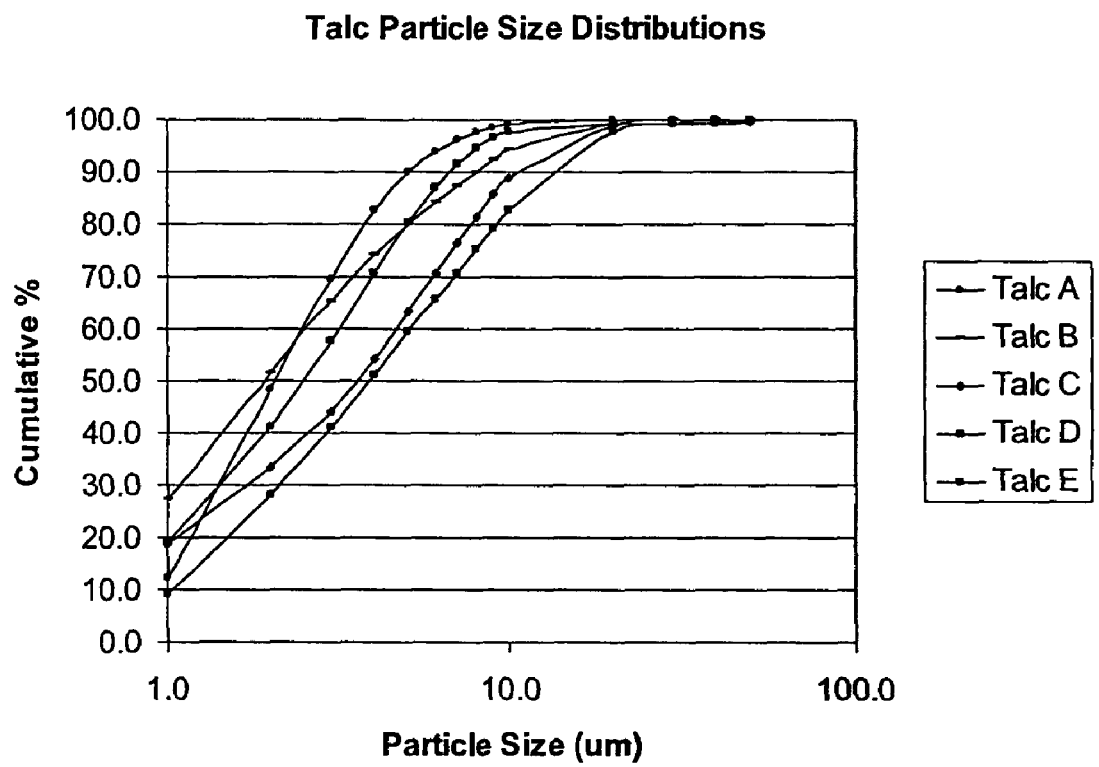

The particle size distributions of Talc A-E are shown in Table 9. In particular, the particle size distribution was measured by a sieve method and the percentage listed in the % below column represents the cumulative percentage of the particle size which is below that corresponding particle size. FIG. 4D graphically represents the particle size distribution for each Talc A-E.

TABLE 9

Particle Size Versus % of Pass

| Particle Size (um) | Talc A (% below) | Talc B (% below) | Talc C (% below) | Talc D (% below) | Talc E (% below) |
| --- | --- | --- | --- | --- | --- |
| 50.0 | 100.0 | 100.0 | 99.5 | 99.5 | 100.0 |
| 40.0 | 100.0 | 100.0 | 99.8 | 99.3 | 100.0 |
| 30.0 | 99.9 | 100.0 | 99.9 | 99.2 | 99.2 |
| 20.0 | 100.0 | 99.1 | 99.0 | 99.1 | 97.7 |
| 10.0 | 99.2 | 94.2 | 88.8 | 97.7 | 82.7 |

TABLE 9-continued

Particle Size Versus % of Pass

| Particle Size (um) | Talc A (% below) | Talc B (% below) | Talc C (% below) | Talc D (% below) | Talc E (% below) |
|---|---|---|---|---|---|
| 9.0 | 98.6 | 92.3 | 85.7 | 96.7 | 79.3 |
| 8.0 | 97.7 | 90 | 81.7 | 94.8 | 75.4 |
| 7.0 | 96.2 | 87.5 | 76.6 | 91.5 | 70.9 |
| 6.0 | 93.9 | 84.3 | 70.6 | 86.8 | 65.7 |
| 5.0 | 89.9 | 80.1 | 63.6 | 80.2 | 59.5 |
| 4.0 | 82.6 | 74.1 | 54.2 | 70.7 | 51.3 |
| 3.0 | 69.8 | 65.3 | 44.1 | 57.8 | 41.1 |
| 2.0 | 48.3 | 51.7 | 33.5 | 41.2 | 27.9 |
| 1.0 | 12.5 | 27.4 | 19.0 | 19.4 | 9.3 |

The foregoing description of the specific embodiments reveals the general nature of the invention that others may, by applying knowledge within the skill of the art, readily modify and/or adapt for various applications such specific embodiments, without undue experimentation and without departing from the general concept of the invention. Such adaptations and modifications, therefore, are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method of reducing skin cracks in cordierite honeycomb articles, comprising the steps of:
    preparing a plasticized batch of ceramic-forming material;
    extruding the ceramic-forming material to form a honeycomb green body having a matrix of webs forming axially extending channels and a surrounding outermost circumferential skin encircling the matrix of webs; and
    firing the green body to form a ceramic honeycomb article, wherein the batch of ceramic-forming material contains talc having (D90−D10)/D50 of greater than 1.50, wherein the ceramic honeycomb article exhibits a porosity ratio of $P_s/P_w \geq 1.12$ wherein $P_s$ is a porosity of the skin and $P_w$ is a porosity of the webs.

2. The method according to claim 1, wherein the porosity ratio $P_s/P_w \geq 1.20$.

3. The method according to claim 1, wherein the porosity ratio $P_s/P_w \geq 1.28$.

4. The method according to claim 1, wherein a pore aspect ratio is controlled by adding to the batch a talc source having a morphology index less than 0.75.

5. The method according to claim 1, wherein a ratio of resistance of crack initiation to resistance of crack propagation (R'''p/R'''o) is greater than about 2.4.

6. The method according to claim 1, wherein the porosity of the web ($P_w$) is less than about 28%.

7. The method according to claim 1, wherein (D90−D10)/D50 is greater than 1.75.

8. A method of reducing skin cracks in cordierite honeycomb articles, comprising the steps of:
    preparing a plasticized batch of ceramic-forming material including alumina, kaolin, boehmite, silica and talc, wherein the talc has a particle size distribution given by the relationship (D90−D10)/D50 of greater than 1.50;
    extruding the ceramic forming material to form a honeycomb green body having a matrix of webs forming axially extending channels and a surrounding outermost circumferential skin encircling the matrix of webs; and
    firing the green body to form a ceramic honeycomb article, wherein a thickness of the skin of the ceramic honeycomb article is less than about 12 mils, and
    wherein the ceramic honeycomb article exhibits a porosity ratio of $P_s/P_w \geq 1.12$ wherein $P_s$ is a porosity of the skin and $P_W$ is a porosity of the webs.

9. The method according to claim 8, wherein the talc has a median particle size between 2.2 μm and 4.0 μm.

10. The method according to claim 8, wherein the talc has a particle size distribution with (D90−D10)/D50 greater than 1.75.

* * * * *